United States Patent [19]

Lungu

[11] Patent Number: 4,926,111

[45] Date of Patent: May 15, 1990

[54] ELECTRIC COMPONENT WITH INDUCTIVE AND CAPACITIVE PROPERTIES

[76] Inventor: Cornelius Lungu, Rossbuehlstrasse 11, D-7582 Buehlertal, Fed. Rep. of Germany

[21] Appl. No.: 332,442

[22] Filed: Apr. 3, 1989

Related U.S. Application Data

[63] Continuation of Ser. No. 128,826, filed as PCT EP87/00072 on Feb. 13, 1987, published as WO87/05147 on Aug. 27, 1987, abandoned.

[30] Foreign Application Priority Data

Feb. 14, 1986 [DE]  Fed. Rep. of Germany ....... 3604579
Aug. 26, 1986 [DE]  Fed. Rep. of Germany ....... 3628988

[51] Int. Cl.$^5$ .................................................. H01F 5/00
[52] U.S. Cl. .......................................... 323/355; 336/69
[58] Field of Search ................... 336/69, 195; 323/345, 323/355; 174/102 C, 105 R, 107

[56] References Cited

U.S. PATENT DOCUMENTS

| | | |
|---|---|---|
| 1,460,390 | 7/1923 | O'Leary . |
| 2,515,676 | 7/1950 | Turner ................... 315/243 |
| 2,564,881 | 8/1951 | Cronshey et al. ............ 336/195 |
| 2,817,066 | 12/1957 | Scarpa ..................... 336/84 |
| 3,005,965 | 10/1961 | Wertanen .................. 336/195 |
| 3,202,592 | 8/1965 | Carmichael et al. ........... 204/58 |
| 3,260,977 | 7/1966 | Coltman ................... 336/181 |
| 3,638,155 | 1/1972 | Combs ..................... 336/69 |
| 3,704,390 | 11/1972 | Grahame ................... 336/69 |

FOREIGN PATENT DOCUMENTS

| | | |
|---|---|---|
| 1538146 | 7/1969 | Fed. Rep. of Germany . |
| 1582185 | 9/1969 | France . |
| 712474 | 9/1966 | Italy ..................... 336/195 |
| 103086 | 8/1980 | Japan ..................... 323/355 |

OTHER PUBLICATIONS

O'Neil, "High Frequency Filter and Trap," IBM Tech. Discl. Bul., vol. 23, No. 12, p. 5322, May 1981, (323-355).

*Primary Examiner*—William H. Beha, Jr.
*Attorney, Agent, or Firm*—Krass & Young

[57] ABSTRACT

The invention relates to an electric component with inductive and capacitive properties, which is wound in coil-like manner in turns and winding layers out of two conductors being electrically insulated from one another, a dielectic being disposed between the conductors. For increasing the capacitance values to be obtained with this component and for achieving a high miniaturization possibility at simple construction, it is proposed in accordance with the invention that both conductors (1,3) are combined into one winding wire (WD) out of a core conductor (1), a dielectic (2) surrounding the latter and an external conductor (3) at least partly surrounding the core conductor (1) and the dielectic (2). Preferably a traditional round wire is used as core conductor. Said electric component can be used in manifold ways. The electric properties are very good.

13 Claims, 5 Drawing Sheets

ID> # ELECTRIC COMPONENT WITH INDUCTIVE AND CAPACITIVE PROPERTIES

This is a continuation of co-pending application Ser. No. 128,826, filed as PCT EP87/00072 on Feb. 13, 1987, published as WO87/05147 on Aug. 27, 1987, now abandoned.

FIELD OF THE INVENTION

The invention relates to an electrical component having inductive and capacitance properties.

BACKGROUND OF THE INVENTION

Such an electrical component is known from the German publication print 20 35 368. In said component two mutually electrically insulated conductors are wound in coil-like manner in turns and winding layers, a dielectric being disposed between said conductors. The conductors are two thin round winding wires coated with an insulation, e.g. a layer of varnish, and wound bifilarly. The insulation serves as dielectric. For forming a magnetic field use is made of currents passing through the components and being of capacitance origin, the capacitance being created between the wire turns of the winding.

Therein it is disadvantageous that the capacitance values obtained are low. The capacitance value may be increased if wires of smaller diameters are used as compared to those as proposed in the German publication 30 24 343. However, such wires are substantially more expensive as the hitherto used winding wires; apart from that the handling thereof is more difficult. Furtheron, a non-uniform dielectric loading of the winding insulation is obtained, using such types of winding.

Moreover, air spaces are formed between the individual turns which gaps in case of higher voltages may cause glow discharges which—as is known from capacitor technology—result in insulation defects. For this reason the winding has to be impregnated sufficiently to exclude the formation of the air spaces.

From the French patent No. 1 582 185 an electrical installation is also known in which a bifilar winding having an inductive and a capacitance property is provided for. A current source is connected to both ends of the first conductor of the bifilar winding, whilst the second conductor being arranged in parallel or concentrically thereto has no connection. By means of the bifilar winding a reduced self-induction is avoided in case of an interruption of the current. Moreover a voltage limited due to the capacitance between the two wires is limited to an amount at which no electric arc is formed between the windings. Said known component is designed for high currents and has thick wires as well as a thick insulating layer, i.e. the component cannot be of small dimensions and also in this case the capacitance values are low.

SUMMARY OF THE INVENTION

The present invention is based on the problem of creating an electrical component with inductive and capacitance properties of the kind in question, which component can be simply manufactured, has good electrical properties and in spite of small dimensions neverthless can store substantial amounts of energy of capacitive origin. Apart from that ways are to be shown, how such wound, electrical components can be made use of to substitute for traditional combinations of coil and capacitor an/or create components with new properties.

According to the present invention the above-identified problem is solved by the features of claim 1. According thereto the electrical component is wound with the aid of special winding wires having at least two electrical contacts, between which an insulation as dielectrical is present.

Advantageous embodiments of the component and advantageous connections are defined in the subclaims.

Preferably a round winding wire made of a round core conductor, a dielectric surrounding the latter and an outer conductor enveloping the dielectric is used. The outer conductor is preferably as uniform and a thin layer as possible; e.g. a metallization, and is applied to the dielectric layer with aid of known physical or chemical processes like evaporation coating, cathode sputtering or chemical deposition.

The winding wire is equally bendable to all directions and can be realized up to very small dimensions with diameters in the range of 0.01 mm. To obtain higher space factors it also is possible to make use of a rectangular embodiment for larger, in particular rotation-symmetrical windings.

Electrical components may be made of such winding wires by traditional winding processes. In case of approximately identical dimensions about 15 to 20 times higher capacitance values may be obtained as compared to the known, bifilarly wound electrical components. No air spaces will occur between the two conductors and thus glow discharges are inhibited. Moreover the winding wire may be build self-healingly, i.e. possible disruptive discharges between the two conductors will not cause insulation defects.

The outer conductor, i.e. the metallization, preferably serves as common capacitor electrode for all turns of the core conductor. The metallization of each turn therefore is electrically connected to a common contacting.

The electrical component under the present invention may be used in manifold cases and substitutes for a plurality of traditional coil/capacitor combinations.

Capacitors and connecting members between capacitors and inductances can be saved using the electrical component by creating capacitive properties within one inductance. Furthermore material is saved as compared to traditional components. The component under the present invention can be miniaturized to a high degree. Apart from that the use of such components as oscillator circuits provides new properties, e.g. frequency adaption up to a ratio of 2:1 by simply changing the resistivity.

Further preferred embodiments of the present invention can be seen from the subclaims.

BRIEF DESCRIPTION OF THE DRAWINGS

The invention now is explained in detail in several embodiments with reference to the enclosed drawings. In the drawings.

DETAILED DESCRIPTION OF THE ILLUSTRATED EMBODIMENT

Figure 1:
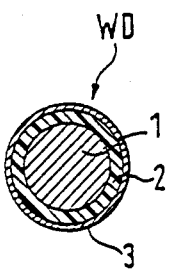
FIG. 1 is a cross-sectional view through a winding wire for a component according to the invention.

A winding wire WD according to FIG. 1 comprises a traditional round wire, e.g. out of copper, aluminum etc, as core conductor 1 carrying a uniform and continuous concentric insulation 2. Said insulations is as thin as possible and consist of one or several layers of identical or different layers, in order to have for a given dielectric strength a relative dielectric constant being as high as possible. The insulation may be effected by known methods like varnishing, powder varnishing, braiding, anodization or the like. A uniform metalization layer being as thin as possible, preferably a thin film, is deposited on the dielectric insulation 2 as external conductor 3. Thus, the capacitive winding wire can be referred to as thin wire capacitor of arbitrary length with two concentric electrodes and dielectric disposed inbetween. The axial electric conductivity of the core conductor 1 is much higher than the conductivity of the external conductor or the metalization 3, respectively. It is the purpose of such embodiment to reduce short-circuited-turn effects to a minimum in view of the fact that due to a conventional winding process the external metalizations 3 of adjacent turns and winding layers touching one another represent closed short-circuited turns.

Figure 2:
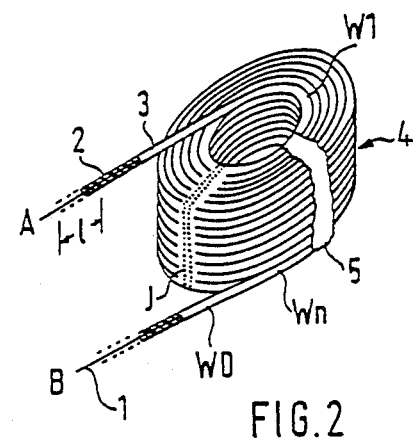
FIG. 2 is a perspective view of a coil-like wound electrical component according to the invention.

According to FIG. 2 a coil 3 formed with a capacitive winding wire WD according to FIG. 1 consists of a continuous winding of several (n) adjacent turns w1 to wn. Thus the metallisation 3 of the turns touching one another forms a closed circuit and an electrical common contact 5 is applied thereto, which contacting consits of thin metal foils being inserted between the turns or is made in form of a sprayed metallic strip.

A simple way of effecting the common contacting 5 lies in that the walls of a bobbin surrounding the winding are coated with metal in such manner that short-circuit currents are inhibited and to use said coating as an electric connection.

In order to obtain sufficiently high length capacity values in particular at low voltages, the insulation 2 may consist of a formation layer produced electro-chemically as is general practice for electrolytic capacitors. In this case the core conductor 1 is made out of aluminium or has an uninterrupted aluminium layer which can be anodized. Instead of the metallization 3 the core conductor 1 together with the aluminium oxide layer 2 is surrounded by a spacer impregnated with a liquid or solid electrolyte. The electric conductivity thereof is low so that the short-circuit winding effect is poor. When the core conductor 1 acts as anode, the electrically connected cathode is formed by aluminium strips inserted between the turns (layers) being surrounded by the spacer 3 of the insulated core conductor 1 the function of which is similar to that of the common contacting 5. In case of turns with liquid electrolyte (like in common electrolyte capacitors) the spacer 3 may consist e.g. of a braiding of cotton or absorbent paper, which is impregnated with electrolyte only after the coil has been wound. The aluminium strips e.g. used as common contacting 5 may be in direct contact with the bobbin which e.g. can also be made out of aluminum. It is in principle possible to build temperature-stable windings, too, of this kind with solid electrolyte in the manner of dry electrolytic capacitors. Therein a spacer consisting of fiberglass right from the beginning is packed with a solid electrolyte, e.g. $MnO_2$. The further steps of manufacturing the coil are similar to those for a dry electrolyte capacitor. For the sake of simplicity only the terms insulation 2, metallization 3 and common contacting 4 will be used in the description, wherein this may equivalently be understood as being carried out with those electrolyte capacitor techniques.

A change of the magnetic flux 0 of the coil 4 has the effect that voltages $U_w = d0/dt$ are induced in the core conductor turns, which voltages add up according to the number of turns so that a potential $U = nU_w$ develops between the beginning A and the end B of the core conductor 1. The same winding potential $U_w$ is created in the metallization 3 being electrically closed to form a circuit, of the winding wire, too. This might lead to disadvantageous short-circuit currents.

Figure 3:
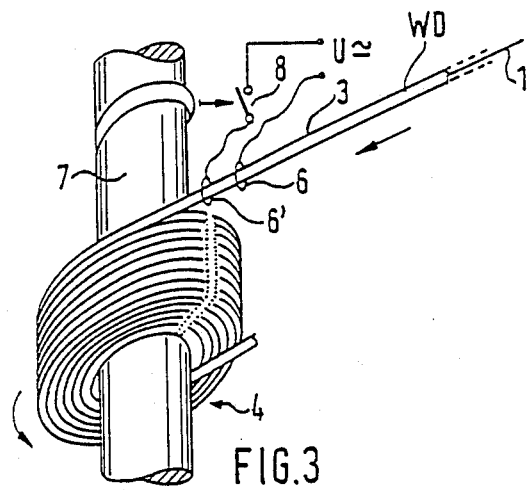
FIG. 3 is a perspective view of a component according to the present invention, intended to elucidate the winding process.

In case of line frequencies said short-circuit currents may for practical purposes be kept low by a metallization 3 applied in a thin layer, so that the effect thereof may be neglected. In case of higher frequencies it is meaningful to interrupt in a well-known manner the metallization 3 at an arbitrary cross-section I of the coil 4, this cancelling the short-circuit effect. To achieve this e.g. the thin metallization 3 is locally removed by electric discharging. Such "burning-out" of the metallization 3 can be effected during the winding process, when the winding wire prior to the winding, (see FIG. 3) is guided between two ring-shaped electrodes 6 and 6'. Said electrodes which may also have the form of brushes or contact trolleys are in continous contact with the metallization 3 of the capacitive winding wire according to FIG. 1.

If now for a short time at the beginning of each rotation of the shaft 7 of the winding machine a suitable voltage is applied to the said electrodes, e.g. via a switch 8 controlled by the shaft 7, this will result in the local destruction of the metallization 3 by heat or discharge effect, respectively. Therein it is important to control the electric discharge in such manner that the insulation is not damaged. As said metallization-free sections on the coil 4 have the same angular position, they cause an interruption of the otherwise closed metallization ring; thereby eddy currents are avoided.

With the aid of similar discharge methods it also is possible to remove the metallization of the winding wire at a given length l also at the beginning A or the end B, respectively, of the coil 4 according to FIG. 2. Thereby it is possible to avoid discharges between the bared coil connections A and B (FIG. 2) and the metallization 3.

Figure 4:
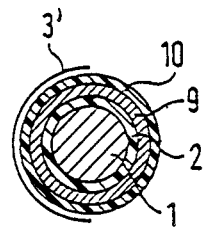
FIG. 4 is a cross-sectional view through a modified winding wire.

Another embodiment of a capacitive winding wire, mainly being reserved for larger conductor cross-sections, is shown in FIG. 4. A core conductor 1 is surrounded by an uninterrupted insulation layer 2 which again is surrounded by a shell conductor 9. For production engineering reasons said shell conductor can be provided with one or several longitudinal crevices. The shell conductor 9 has a current-passage cross-sectional area being equal to or differing from that of the core conductor 1. An outer insulating layer 10 surrounds the shell conductor 9 and prevents it from short-circuiting through adjacent turns.

The conductors 1 or 9, respectively, consist of metal, e.g of aluminium or soft copper.

The properties of the insulation 10 are similar to those of a dielectric for a capacitor. The insulation may be effected by common methods like varnishing, sheathing, braiding etc.

A special variant in effecting the insulation 2 being in particular suitable for low voltages, is an embodiment being similar to the electrolytic capacitor. Therefor an anodic formation layer out of e.g. $Al_2O_3$ is formed on the core conductor 1 or the shell conductor 9, respectively, or on both of them. Said conductors then consist of aluminum or are provided with an aluminum layer which may be anodized, and like in case of the electrolytic capacitor a spacer filled with liquid or solid electrolyte is disposed betweeen said two conductors. A substantially increased capacity is achieved by said known method. The insulation 10 as winding insulation has to meet lower electrical but higher mechanical demands. Said insulation has to prevent the thin shell conductor 9 from deforming during the winding process. In the embodiment with liquid electrolyte the insulation 10 has to inhibit the leaking of the electrolyte. Said insulation may consist of a varnish layer, as in common winding wires, or of a simple and/or varnished braiding, respectively.

A winding wire with two capacities being switchable independently from one another is formed by the thin coating (similar to that described for FIG. 1) of the capacitive winding wire according to FIG. 4 with a thin film metallization 3' surrounding the hitherto described combination concentrically. An additionally usable capacity is created between said metallization 3' (shown only at the left-hand side of the axis of symmetry in dash-dotted manner) and the shell conductor 9.

Figure 5:
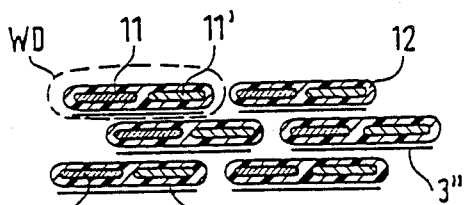
FIG. 5 is a cross-sectional view through a part of the electrical component according to the present invention with an additional embodiment of the winding wire.

In FIG. 5 a part of a winding of an electric component with a band-shaped winding wire WD is shown. It consists of two adjacent electrically conducting flat wires 11 and 11' being imbedded in an insulating plastic mass 12 serving as dielectric. The production can be effect in very simple manner, e.g., when the two conductors 11 and 11' are pasted on an insulating foil and thereupon are covered by a second insulating foil. To one side of the band conductor formed thus a thin film metallization 3" is applied. As is known from capacitor technology insulation and metallization may be mutually tuned in such manner that insulation punctures are self-healing.

Within the winding the different layers of the band-shaped wound conductor lie on one another so that the non-metallized outside of the band conductor of one layer is in contact with the metallization 3" of the next layer. On the respective breadths thereof the common metallization 3" forms length capacitances Cl and Cr being mutually coupled in series, with the conductors 11 and 11'. Thereby the metallization 3" as common electrode of two capacitors switched in series, is on a medium potential as compared to the potentials of the flat wires 11 or 11', respectivey.

Additional capacities are formed between the individual turns of the band conductor WD. The length capacitance of the winding formed thus, between the conductors 11 and 11' at equal strength of the insulation on the metallized and/or non-metallized sides, respectively, amounts to approximately twice the capacity of the non-wound band conductor.

A spacing amounting to a multiple of the area insulation strength is provided for between the conducting flat wires 11 and 11'. In this way it is achieved that disruptive discharges are avoided between the conductors. Possible punctures then only will take place between one of the conductors 11 or 11', respectively, and the metallization 3" which will be destroyed at the point of disruptive discharge, however, without causing severe consequences for the winding. Thus it will be possible, similar to a self-healing capacitor, to achieve increased volume capacitance values by an increased stress of the dielectric.

For simplifying the explanation of the electric processes in a coil storing capacitively rt can be shown that the physical-electrical processes taking place in windings basically are identical, even if the windings are carried out with different capacitive winding wires. The occurring differences are a matter of circuitry practice only. Therefore, it will be possible to transfer the later-described circuits to other kinds of capacitive winding wire.

Figure 6A:
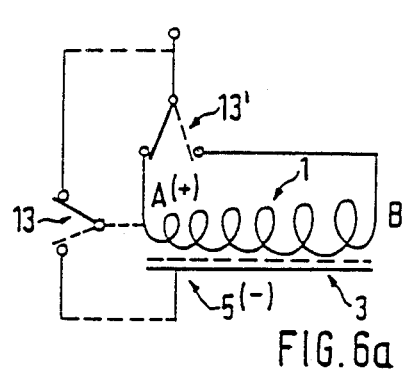
FIGS. 6a and 6b are equivalent circuit diagrams of a component according to the present invention.

In order to elucidate the operating manner of coils storing capacitively, with different kinds of capacitive winding wires, the basic processes, i.e. charging (or supplying of a ac-voltage), discharging (or output of ac-voltage) and reversal of polarity, are explained for the two basic kinds of capacitive winding wires. FIG. 6a shows a coil in extended view, which in its original state looks like that of FIG. 2, i.e. it is wound with the metallized winding wire according to FIG. 1, A being the beginning of the core conductor 1, B being the end thereof and 5 being the common contacting being in common for all of them, of the metallization 3.

Figure 6B:
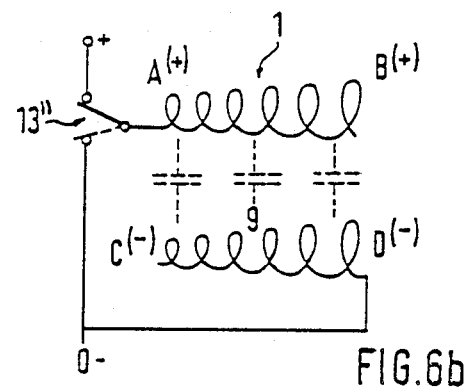

FIG. 6b shows a coil being wound with the winding wire according to FIGS. 4 or 5, in which as compared to FIG 6a the shell conductor 9 or the second conductor (11' in FIG. 5) with the beginning C and the end D, respectively, is present in place of the metallization 3.

The magnetic core of the coils being the carrier of a magnetic flux is not shown in FIGS. 6a and 6b.

According to FIG. 6a the charging is effected between the points A+ and 5−, the magnetically effective current flowing through the core conductor 1 in the direction AB. In case of a discharging between A+ and 5− the current flows in reverse direction from B to A. A switching-over contact 13 is sufficient for the charging/discharging process. A change of polarities of the magnetic processes is effected by the charging and/or discharging via B+ instead of A+ without changing the polarity (−) of the common contacting 5. Therefore, a switching-over contact 13' is sufficient for inverting the processes.

There is a difference between a charging and/or a discharging through A and B not only with respect to the direction of current flow. The time curve of the current intensity differs, too, as the windings being adjacent to the core conductor end B due to their enlarged circumference store more energy $$\left(\frac{nF}{m} \cdot mU^2\right)$$

than the turns at the beginning.

According to FIG. 6b a magnetically effective charging process has to occur between the points A+ and D— that the current flows through the core conductor 1 or the shell conductor 9, respectively, in the same direction (from A to B or C to D). It can be seen that as compared to FIG. 6a the current flows through twice as much turns, so that at the same current intensity distribution a magnetic field with double intensity is generated. A discharging between A and D via the change-over switch 13" causes currents being opposite in direction with respect to a charging (from B to A or D to C), this also resulting in the magnetic effect having the opposite sign. A change of polarities of the charging process is possible otherwise than in FIG. 6a (without changing the polarity of the current source) if the supply is effected through the points B+ or C—.

Therefor two switching-over contacts are required and the magnetic effect (except for the sign)—in contrast to the case in FIG. 6a —is the same as in case of a supply through A+ or D— when the linear resistances of the core conductor 1 and the shell conductor 9 are equal.

Taking into account these circuit engineering facts it is in principle possible to build capacitively storing coils with the winding wire according to FIGS. 1 or 4 or 5, respectively, with the same capacity and magnetically effective number of turns.

Thus it is at equal linear resistance of the core conductor 1 and the shell conductor 9, respectively, only necessary to provide n windings of the winding wire according to FIG. 4 instead of 2n windings of the winding wire according to FIG. 1, wherein the length capacitance of the latter has to be of twice the value.

The winding wire according to FIG. 4 (left cross-sectional half) with the core conductor 1, the shell conductor 9 and the metallization 3' can be considered as being a combination of the two cases explained above. The capacitive current in the shell conductor 9 is the sum of the capacitive currents being generated between the latter and the core conductor 1 or the metallization 3'. It will be possible at any time to load the core conductor 1, the shell conductor 9 or the equivalents 11, 11' thereof, according to FIG. 5, in addition to the capacitive current with a purely inductive current like in a traditional inductive winding. According to known rules it may become necessary to enlarge the respective conductor cross-sectional area in this case.

Figure 7A:
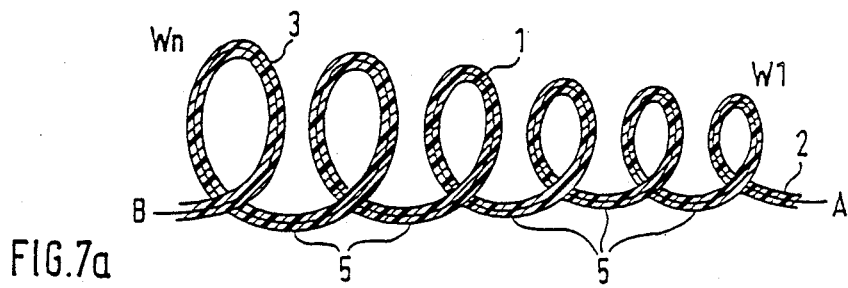
FIGS. 7a to 7d are schematically exploded views of a winding to be used as oscillator circuit, of the component according to the present invention as well as diagrams for elucidating the operating mode.
Figure 7B:
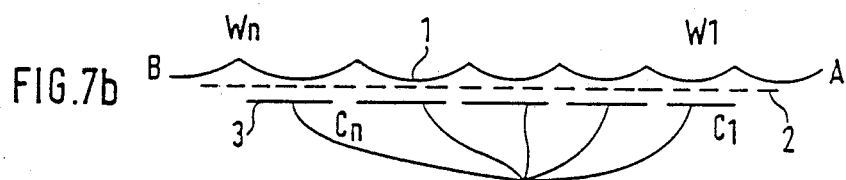

For the sake of a simpler analysis of the electromagnetical properties of a coil 4 according to FIG. 2, such coil is shown with loose turns in FIG. 7a and symbolically is shown in FIG. 7b as capacitor with an inductively effective electrode (core conductor 1). For simplification of the analysis the most important electrical parameters are looked upon as discrete values, each with respect to one turn.

From FIG. 7, with reference to FIGS. 1 and 2, the core conductor 1 can be seen which is freed from the insulation 2 (shown in dash-dotted line) at its beginning A or/and its end B. As has already been described, the metallization 3 is interrupted at each turn (in peak position, FIG. 7a), however, the metallization of each turn is in electric contact with the common contacting 5.

Thus each individual turn (W1—Wn) can be considered as being a capacitor the capacitance of which is proportional to the respective turn length and can be calculated with the aid of the formula for concentric lines. The metallization 3 of the individual turns always is on the same potential over the common contacting 5; the potential position of the individual windings in mutual relation, however, depends on the variation of the magnetic flux penetrating the coil.

Figure 7C:
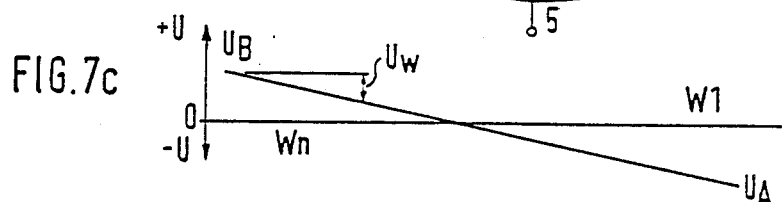

In case of a definite change of the magnetic flux a difference of potential U=dφ/dt uniformly being distributed over all turns is created between the beginning A and the end B of the core conductor 1 so that the turn voltage Uw=U/n (FIG. 7c).

When the potential between the core conductor 1 and the common contacting 5 was zero prior to the modification of the magnetic flux φ, the potential U as compared to the common contacting 5 is divided into a negative component at the beginning A of the core conductor and a positive component at the end B of the core conductor. This is due to the turn capacitances which are charged when the potential is created. This charging of the individual turn capacitances is respectively based on charging currents flowing between the core conductor 1 and the metallization 3 for the respective turn region. The magnitude of such currents thus depends on the respective turn capacitance $C_w$ or on the voltage level of the respective turn as compared to the common contacting 5. In the region of the positive or negative potential, respectively, said currents have opposite directions and since the coil has no external connection and no current may flow to the outside, the sum of the positive and negative currents, having been caused in capacitive manner, is zero.

As the common contacting 5 is a common capacitor electrode, the balancing of said currents is effect by the core conductor 1 reaching the maximal current load in the region of the turn the potential of which is zero.

Figure 7D:
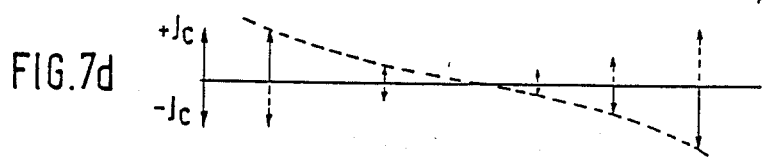
Figure 7E:
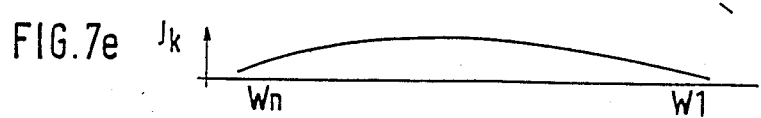

The curve of the capacitive currents between the core conductor and the metallization of the respective turn is shown in FIG. 7d and the current load of the core conductor 1 as sum of said currents can be seen from FIG. 7e. Said currents counteract against the voltage change at the individual turn capacitances and thus counterbalance a change of the magnetic flux.

When the change of the magnetic flux comes to a stop the positive and negative charges produced in the above-described manner, of the turn capacitances $C_w$ now show a tendency to a mutual compensation via the core conductor 1.

This results in that the currents shown in FIGS. 7d and 7e reverse their directions so that now a current flows in the core conductor 1 in opposite direction, again generating a magnetic field.

The mutual charging and discharging of the turn capacitances of a coil according to FIG. 2 in connection with the antagonistic variation of the magnetic flux causes an electromagnetic oscillation, similarly to a traditional oscillator circuit, the oscillation being damped by losses due to resistivity and magnetisation changes.

Said oscillation can be excited by a rapid change of the magnetic flux and has a sinusoidal curve as long as the saturation range of a magnetic core of the coil 4 is not reached. The damping of said oscillation can be compensated for in known manner by a synchronized power supply from the outside in form of electric or magnetic energy, this resulting in that technically utilizable oscillation of constant amplitude are maintained like in a traditional oscillator circuit. The frequency of said oscillation may be determined by means of largescale calculation processes with know formula, if for each turn the characteristic values thereof (R - L - C) are taken as basis as discrete quantities. The frequency of a traditional oscillator circuit can be taken into account as approximation method for practical use, which circuit has the same core reluctance and winding parameters, wherein an external capacitance is used being approximately as large as the total capacitance between the core conductor 1 and the common contacting 5. The natural frequency of the inductive-capacitive coil 4 according to FIG. 2 in this case is approximately 3 times higher than the natural frequency of a traditional oscillator circuit.

Figure 8A:
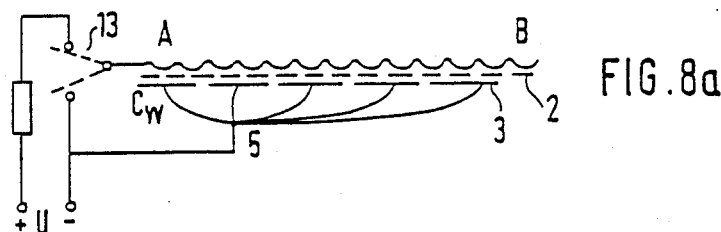
FIGS. 8a to 8c are equivalent circuit diagrams of a further component used as oscillator circuit, with diagrams for elucidating the operating mode.
Figure 8B:
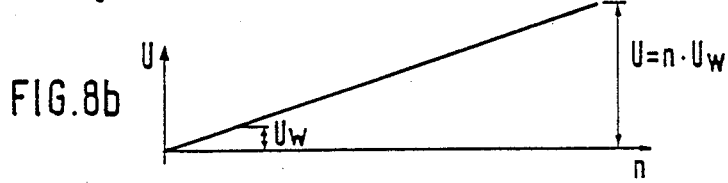

A simple way of reducing the frequency of said oscillation approximately by the factor 2 is shown in FIG. 8. Therein the common contacting 5 of the winding wire metallization 3 is connected to the beginning A or the end B of the core conductor 1 with the aid of a changeover switch 13. This causes a displacement of the maximal potential U as sum of the turn potentials $U_w$ altogether between the common contacting 5 and the free end of the core conductor 1, resulting in a charging of all turn capacitances $C_w$ with a potential of the same sign and seen in total to a higher voltage level. Due to this the capacitive energy storing capacity of the winding is larger, this increasing the time constant of the oscillator circuit. FIG. 8b shows the potential gradiant along the core conductor 1.

Figure 8C:
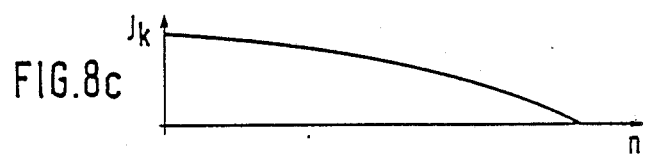

Such oscillator circuit can be excited to carry out an oscillation not only-as has been described above-by a change of the magnetic flux, but also by charging and subsequently discharging the turn capacitances. For this purpose according to FIG. 8a the core conductor beginning A is connected to the positive pole of a voltage source via the change-over switch 13. If now upon having charged the winding the core conductor beginning A is connected to the common contacting 5 (negative pole), the turn capacitances will be discharged a the core conductor 1 and result in a current which reaches its maximal value at the beginning A of the core conductor 1 (current gradient along the core conductor, as is shown in FIG. 8c). Similarly to the above-described case also here a damped oscillation is produced the frequency of which is about 1.5 times as high as the frequency of a traditional oscillator circuit having the same coil parameters and/or the same capacity, respectively. A potential created between the core conductor 1 and the common contacting 5 can also be discharged via the end B of the core conductor 1. Like in the present case an oscillation is generated the frequency of which at common technical coil dimensioning is somewhat higher than that of the previous case (connection to A). The explanation therefor lies in the reversed distribution of turn capacitances along the discharge line via the core conductor 1. The turn capacitances being proportional to the turn lengths increase between the beginning A and the end B of the core conductor 1. Damped oscillations occur not only in case of a discharging, but also in case of a charging via the beginning A or the end B or the core conductor 1. The oscillations have the same frequency as in case of a discharging. A presupposition therefor lies in that a current source of sufficiently low impedance is utilized. The described arrangements can in manifold and preferable manner be used technically. A coil 4 according to FIG. 2, in particular when having a magnetic core, may substitute traditional oscillator circuits without a capacitor being required.

An additional property of the oscillator circuits having been produced with capacitive winding wire in the above-described manner lies in that the oscillation frequency can be changed in a ratio of 2:1 with the aid of a variable resistor.

If in an oscillator circuit, e.g. that of FIG. 8, resonant oscillations are excited and the resistance between the core conductor beginning A and the common contacting is extended from Q to infinite, the oscillation frequency would increase to 200% of the original value. The excitation of the oscillation, the energy supply for the damping compensation and/or the reduction of a oscillation signal can be effected via the core conductor 1 (seen as purely inductive winding) as well as via an additional inductive winding in known manner.

An important field of use for capacitively storing windings, as in FIG. 2, is magnetotechnology. Here the charging/discharging of such windings is transferred into mechanical work. It can be proved theoretically as well as in practice that in case of equal wire diameters, insulation properties and total turn number the capacitance of a coil wound bifilarly according to prior art is 15-20 times less than the capacitance of a corresponding coil according to FIG. 2. This means that mechanical work to be achieved with such coil is substantially larger, this justifying the use in technical fields.

Figure 9A:
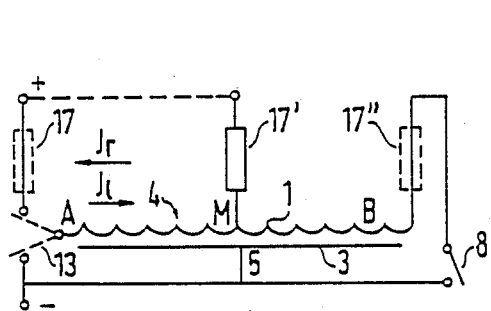
FIGS. 9a to 9d show a component according to the present invention used as relay as well as equivalent circuit diagrams thereto.

FIG. 9a shows a coil 4 according to FIG. 2 in simplified schematical form. The core conductor 1 with the beginning A of a (seen from the point of view of inductance) coil centre tapping M and the end B is opposed to the common contacting 5 of the metallization 3 in the kind of a capacitor plate. According to FIG. 9b the coil serves e.g. as winding 4 of a known bistable flap-anchor magnetic system of a relay. The flap anchor 14 is attracted by the magnetic core 15 by a short strong magnetic field, in which position it is kept due to the residual magnetism against the force of a restoring spring 16. By magnetic fields being opposite in polarity and as a rule being less strong the residual magnetism in the core 15 may be quenched, whereupon the flap anchor 14 returns to its external position. A coil arrangement according to FIG. 9a can at lowest energy consumption in manyfold ways supply the magnetic pulses serving for actuating the flap anchor 14.

A first possibility lies in that the positive and negative poles of a current source are connected to the upper contact of a change-over switch 13 and to the common contacting 5. The switching rocker of the switch 13 is connected to the beginning A of the core conductor 1 and the bottom contact is connected to the common contacting 5. If the core conductor 1 is connected to the positive pole, a current 11 will flow through the coil, resulting in a corresponding magnetic field. The strength of said magnetic field may be limited by a resistor 17, if the field is to be used as demagnetization field.

Figure 9B:
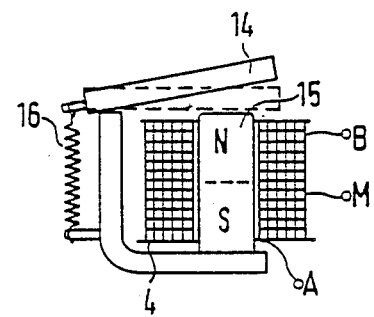

The current taken from the power source then will be low, it is however sufficient to initiate the lifting of the flap anchor 14 under the effect of the spring 16. If now the capacitively charged winding is connected to the negative pole (5) via the change-over switch 13, a current Ir will flow through the winding from right to left. This current causes the attraction of the flap anchor 14 by the magnetic core 15 and the permanent magnetization thereof. If low currents are to be taken from the energy source, the positive pole of the energy source is connected to the centre tapping M of the core conductor 1 via a resistor 17'. The resistor 17' is dimensioned such that the winding can sufficiently recharge between two dischargings. In case of relays at common voltage levels it is in general sufficient to use resistances of a mega-ohm range so that the taken currents are extremely low and further decrease by some orders of magnitude upon charging of the coil capacitance. The capacitive energy may now be discharged through the core conductor beginning A or the core conductor end B to the negative pole (5) with the aid of the switches 13 or 8, this resulting in opposite currents Il or Ir. With the aid of a resistor 17" one of said currents may be reduced to such degree that a lifting of the flap anchor 14 is effected. This means that the discharging of higher current intensity via the core conductor beginning A causes the attraction and subsequent retainment of the flap anchor 14. The closing of the switches 13 and 8 must be of only short duration to permit a recharging of the capacitive winding. It is self-evident that electronic switching means can be used in place of the mechanic switches. Even if a monostable magnetic circuit is to be used instead of a bistable one, a capacitively coil will provide advantages. A magnetic circuit according to FIG. 9b is taken for example, wherein the magnetic core 15 consists of a material with a remanent induction being as low as possible so that the flap anchor 14 cannot latch during currentless condition of the coil.

Figure 9C:
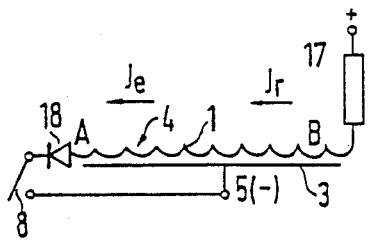
Figure 9D:
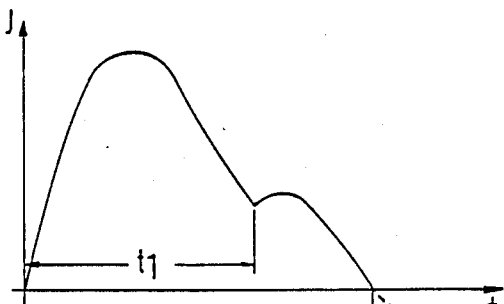

According to FIG. 9c a circuitry is built in which the core conductor 1 is supplied with power via a resistor 17. The common contacting 5 is connected to the negative pole of the current source. The beginning A of the core conductor 1 may be connected to the negative pole (5) via a rectifier diode 18 and a switch 8. The resistor 17 is selected such that the current flowing in stationary condition through the core conductor 1 to the negative pole is capable of keeping the flap anchor 14 securely latched to the core 15, however, not being capable of attracting it. In common magnetic systems said current and the relating power absorption are substantially lower than the attraction currents. During open condition of the switch 8 the coil 4 charges up to the potential U of the current source. If now the switch 8 is closed, the capacitively stored energy discharges and causes a current attaining a high value $I_e$, which is capable of attracting the flap anchor 14. The diode 18 prevents the current in the core conductor 1 from reversing as consequence of possibly occurring current oscillations. Once the discharging is completed, a low-voltage hold current $I_r$ will flow through the core conductor 1 now having the effect of a traditional inductive winding. An interruption is effected by opening the switch 8, the flap anchor 14 is lifted and the coil again is charged capacitively. The explanations given subsequently to FIG. 9 or with respect to the magnetic circuit of a relay of course also is valid for other monostable or bistable kinds of magnetic circuits which in dependance on the dimensioning may develop substantially higher lifting capacity. Thus it is in principle possible to utilize a capacitively storing winding in almost all kinds of relays, actuators, magnetic valves, magnetic brakes, magnetizing means etc.

For carrying out such action successfully it is necessary to consider the oscillator circuit behaviour of such windings in connection with the magnetic system. Due to the fact that most of such magnet drive systems comprise solid yoke members out of metal, which are prone to high magnetic hysteresis losses, the damping of the oscillations as a rule is high. It is desirable to select the inductance and the capacitance and values of capacitively storing windings such that the mechanical response time of the driving system amounts approximately 0.4–0.8 of the oscillation period. This inhibits oscillations of the work anchor and makes the electic circuit simpler. The theoretical determination of the period of oscillation of a magnetic circuit with capacitively storing winding provided with a movable anchor is difficult because of the reluctance varying in time with respect to the point of time of lifting operation. However, it is not necessary that this determination is very exact and the determination by test, of the oscillation period is suitable for being used in industry. For this purpose a working model of the magnetic circuit including the load to be driven is built as prototype of the respective object (magnetic drive, magnetic valve, relay etc.) with a traditional inductive winding for a given voltage level using traditional production methods. Said voltage level should be approximately by 20–80% lower than the voltage level which is to cooperate with the used subsequently capacitively storing winding. The excess voltage is chosen if it is intended to obtain a faster response of the apparatus. The mechanical or/and electrical dimensioning of the winding is chosen such that later on a capacitively storing winding the core conductor 1 of which has approximately the same ohmic resistivity, can be located in the winding space. As compared to the usual winding wire the capacitively storing winding wire according to FIG. 1 has -at equal linear resistance-a somewhat increased outer diameter. Now capacitors are charged up to the above-cited higher voltage level and are discharged via a rectifier diode through the magnetic winding until the lowest capacitance guaranteeing a reliable functioning of the apparatus has been found. Said discharging process is recorded with the aid of an oscillograph, if required without the diode which is to prevent a current reversal in the winding. Usually the oscillogram shows a time curve as can be seen from FIG. 9d, of the discharge current. The time interval $t_1$ is the mechanical response time of the driven apparatus. $T_2$ is the period of the first positive discharge oscillation under real conditions (with a reluctance variable in time, of the magnetic circuit as consequence of the mechnanical work). Now a time period t lying between $t_1$ and $t_2$ is chosen, as oscillation period of the magnetic system with capacitively storing winding. For determining the capacitance of the winding, said time period is increased by the factor 1.41. Following the formula $T=2\pi\sqrt{L.C.}$ the capacitance found before is increased by the factor 2. The capacitively storing winding to be inserted subsequently is dimensioned for said enlarged capacitance. If at a given winding resistance and an existing capacitively storing winding wire a capacitance value being too high is produced due to the winding parameters, the winding may be divided into a capacitively storing portion and a purely inductive portion so that the capacitively storing portion may discharge via the inductive portion. In case of an insufficient linear capacitance of the winding wire it is suitable to use several thin wires being connected in parallel and wound simultaneously, of the same kind. Usually the previously found capacitance value includes an excess in power.

The advantages of said circuitry are those which are generally known in pulse technology, namely increased economies in energy (up to more than 99%), increased efficiency and in most cases a negligible heating up of the coil. As compared to the known pulse techniques energy-storing windings provide the advantage that here the pulse duration or the pulse amplitude, respectively, need not be determined from the outside by additional components, but is formed by the properties of the coil exclusively. As the coil is self-discharging, no external means—with the exception of a mechanical or electronic swrtch—are required. The switch may be located within a metallic magnet casing in a manner by simple means guaranteeing explosion-proof safety and interference neutrality with respect to adjacent sensible electronic components. As the charging currents of capacitively storing coils can be extremely low, it is also simple to build the leads thereto in interference-neutral and explosionproof form.

Because of the capacitive properties of a coil 4 according to FIG. 2 a plurality of possibilities for use with alternating current are given. These in particular relate to motors with additional auxiliary phases, magnet drives, reactive power compensation and voltage peak suppression, miniaturization of magnets and transformers.

A capacitively storing coil being connected to AC voltage between a core conductor 1 and a common contacting 5 in principle shows the behaviour of an inductance connected in series with a capacitor. The current flowing through the core conductor 1 and generating an alternating field is of capacitive origin and leads the voltage. The current as sum of all capacitive turn currents is decreasing to the end B of the core conductor, see FIG. 8c; for this reason the alternating field of a capacitively storing coil is at equal inductance and capacitance somewhat weaker than that of a comparable coil being connected in series with a capacitor.

Figure 10:
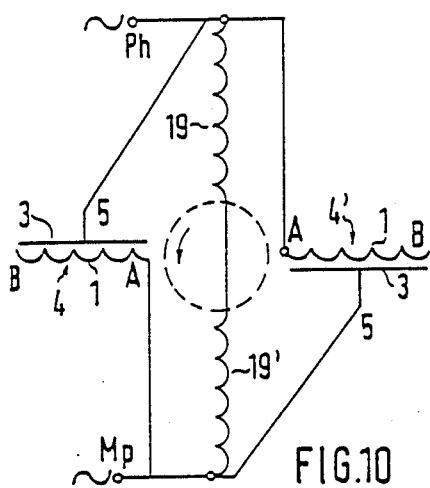
FIGS. 10 to 21 show equivalent circuit diagrams for further embodiments of the electrical component according to the present invention.
Figure 11:
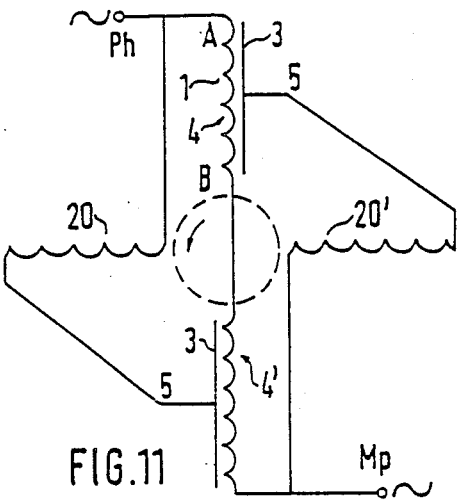

Important fields of use for such circuitries are—beside magnetic line regulators—in particular motors with additional auxiliary phases, which originally have been designed as phase-split capacitor motors. FIG. 10 is a schematic view of such an engine with a main winding 19, 19' being connected to mains supply. In FIG. 10 the auxiliary phase winding of this motor originally being connected in series with the phase-shifting capacitor is provided with a bipartite capacitively storing winding 4, 4'. Due to the non-uniform voltage level of individual windings it is in case of a capacitively storing coil not possible to directly translate the reactive power of a phase-shifting capacitor, being calculated with the formula $P_B = U_C^2 \times 2 f \times C$ to the total winding capacitance. The required reactive power in this case is the sum of individual reactive power components found in dependance on the potential of all turns or coil sections. The line voltage U applied between the beginning A of the core conductor and the common contacting 5 increases in direction of the core conductor end B in dependance on the respective number of turns and of the magnetic flux. Another motor circuitry is possible because of the fact that a coil functioning inductively in known manner can be wound with capacitive winding wire, the core conductor 1 at equal turn number being connected via the beginning A and the end B like a traditional winding. Then an auxiliary phase winding connected to the common contacting 5 is connected in series with the coil capacitance existing between the core conductor 1 and the metallization 3. Also in this case it is necessary to take account of the different voltage levels of the turns or coil sections in determining the reactive power contributions. Such arrangement of connections is shown in FIG. 11. The main windings 4 and 4' are wound with capacitive winding wire and are connected to the lines. The auxiliary windings 20,20' are interconnected between the common contactings 5 of the main windings 4 and 4' and the mains supply. It can be taken from the circuit diagram that capacitive currents of the auxiliary windings 20, 20' are added to the inductive current of the main winding 4 or 4', influencing the phase position thereof. However, already at equal turn numbers of the windings 4 and 20 this influence is low so that performing motors are produced. This influence can be further reduced by increasing the number of turns of the auxiliary windings 20, 20'.

Figure 12:
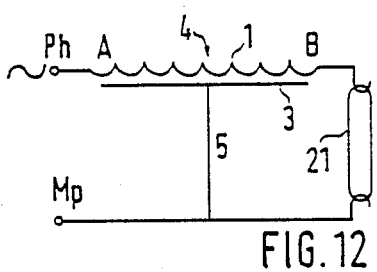

If required it will also be possible to build the main windings 4, 4' as well as the auxiliary windings using capacitive magnet wire so that a combination of the circuitries of FIGS. 10 and 11 is formed. Circuitries of this type can be easily realized also for reactive power compensation and are advantageous. If the ballast 4 of a fluorescent lamp 21 is caused by winding with a capacitive winding wire (FIG. 12), then a capacitance distributed along the winding is created as has been described above. The common contacting 5 of the metallization 3 is connected to the means to which the fluorescent tube 21 has already been connected. Apart from compensating for the reactive power this circuit also suppresses line disturbances caused by the fluorescent tube. Here the energy-storing coil 4 with its distributed capacitance is connected in parallel with the fluorescent tube or the mains supply, respectively.

The capacity of a capacitive winding wire wound ballast can be designed lower with a higher operating voltage, the winding capacitance of which ballast is connected in series with the flourescent lamp.

Figure 13:
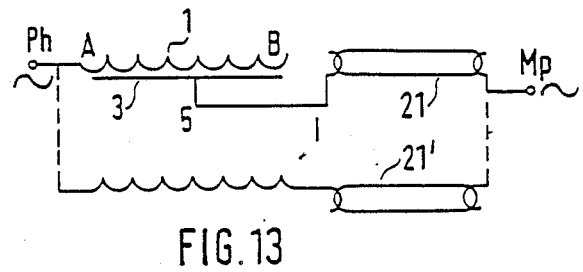

As is shown in FIG. 13, the beginning A of a capacitively storing coil is connected to a line conductor, the end B of the core conductor 1 being free. Said winding is disposed within a usual sheet packet provided with air gaps. A fluorescent lamp 21 is connected between the common contacting 5 and the other line conductor. Due to this series connection of the capacitances the current leads to the potential so that a capacitive reactive current is produced. In order to compensate therefor it is possible, as is known from traditional lead-lag connections, to connect a second lamps 21' being provided with a traditional inductive ballast in parallel with the first.

Figure 14:
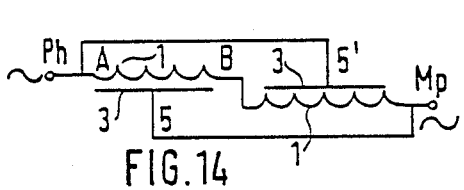
Figure 15:
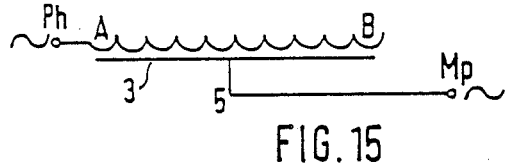

In case of transformers, reactors and other inductivities being connected to the mains it is easily possible to subdivide a winding into the sections and to build those with capacitive winding wire. This results in two common contactings 5, 5' each being connected to the beginning of the adjacent winding connected to the mains, see FIG 14, of the metallization 3. In particular in case of transformers working under partial loads this leads to a reduction of the generated inductive reactive power. Particularly in miniature transformers open capacitive windings according to FIG. 15 may be used. The transformer wound with capacitive winding wire shows the behaviour of a transformer connected in series with a capacitor and usually is operated in the saturation range via forced oscillation. A short circuit of the secondary winding build in traditional manner, causes a reduction of the primary current and thereby prevents a dangerous overheating. Moreover the resonant behaviour has a stabilizing effect on the secondary voltage.

There are mains supply cases in which the miniaturization of some components (transformers, relay, synchronous motors etc.) is limited by the dimensions of the coil. At smaller iron cross-sections the turn voltages become smaller, therefore the number of turns must be increased. The upper limit of smallest diameters to be technically achievable, of winding wires is approximately 0.01 mm, said limit to be economically relizable often is approximately 0.05 mm in diameter. To obtain a coil as small as possible it is therefore necessary to limit the number of turns which either is rendered impossible by the mains voltage or would presuppose greater iron cross-sections (larger dimensions). Therefore in smaller components often in addition compensating resistors or capacitors are used. To avoid this open windings built with capacitive winding wire according to FIG. 15 may be directly used. The required number of ampere-turns herein is obtained with smaller turn numbers at a somewhat higher current of capacitive origin without requiring additional components. The advantages of the cases described with respect to alternating current applications relating to the substitution of capacitors and additional miniaturization are unequivocal.

Figure 16:
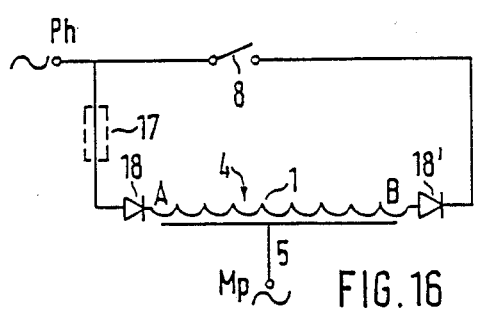

With the aid of capacitively storing windings substantial progress can be made also in a.c.-magnet technology (in magnet drives, relay, contactors, magnetic valves etc.) by using special circuitries which avoid an alternating field and thus eddy current losses. An alternating current being dispersed into negative and positive halfwaves with the aid of two diodes, FIG. 16, subsequently to a capacitive winding according to the present invention produces a magnetic field of constant polarity and low pulsation. A capacitively storing winding 4 is connected to a line conductor via the common contacting 5. With the beginning A the core conductor 1 is connected to a diode 18 with positive polarity, the end B is connected to a diode 18' with negative polarity. Said diodes may be connected to the other line conductor either directly or via a resistor 17 or a switch 8, respectively. As soon as the switch 8 is opened the winding will be positively charged via the resistor 17 and the diode 18. By the closing of the switch 8 and the occurrence of a negative half-wave an impulse discharge of the winding is effected and then the winding is negatively recharged via the diode 18' so that a high current flows along the core conductor 1 from A to B. A subsequent positive half-wave will only because of the resistor 17 only be able to partly reverse the polarity of the charge of the winding by a current flowing in the same direction so that the next negative half-wave causes a lower current. It is guaranteed that a current impulse will be created upon closing of the switch 8, the content of energy of said impulse not depending on the value of the resistor 17. The current flowing later on consists of asymmetrical half-waves and depends on the value of the resistor 17. It can be seen that the current flows through the core conductor 1 always in the same direction AB and even is maintained between two half-waves due to the flywheel- effect of the diodes 18 and 18'. The vibration of a holding-on magnet is inhibited thereby and simpler non-laminated electromagnetic circuit elements may be used. The impulse current at closing of the switch 8 causes a more effective attraction of a holding -on magnet which only must be kept in position in known manner by the current flowing lateron. This causes a reduction in power consumption. If such effect is not desired, the resistor 17 and/or the switch 8, respectively, can be bridged so that the initial and the constant current are equal.

Figure 17:
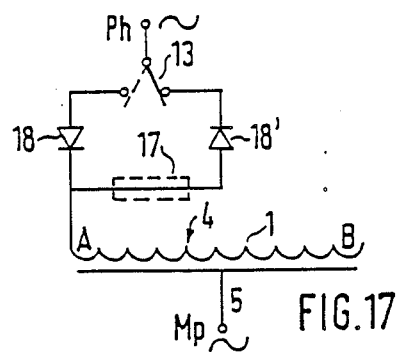

A particularly advantageous circuit arrangement for magnetic drives with permanently magnetizable core (bistable magnetic drives), e.g. as shown in FIG. 9b, is shown in FIG. 17. An a.c.-source is conneted between the common contacting 5 and a change-over switch 13. Through the change-over switch 13 the winding 4 can be positively charged via the core conductor beginning A via a diode 18 and negatively via the other diode 18' (and if required a current-limiting resistor 17). The reversal of charge (of polarity) via the change-over switch 13 has a two-fold effect as compared to a single charging or discharging . It can be seen from the circuitry that the direction of current flow changes when switching over so that a magnetizing-demagnetizing or reversal of magnetizing of a magnetic core may take place.

Due to the capacitive properties of the above-described winding wires also several other windings wound with such winding wires according to FIGS. 1, 4 and 5, are capable of storing energy and thereby supressing voltage peaks and transient effects. Depending on the intended use capacitors or interferences suppressor elements can be omitted.

A field of use of capacitive-inductive windings is found in timing relays. One possibility lies in using the capacitance of a winding as capacitor of a RC time element. The energy capacitively stored in the winding upon a course of time determined by the charging current, can be discharged through the core conductor AB when a certain voltage level is exceeded, and thereby the relay is actuated.

Figure 18:
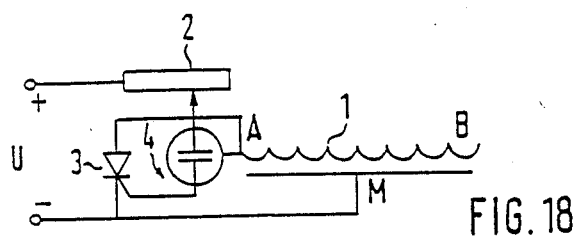

According to FIG. 18, e.g., the winding, wound with capacitive winding wire, of a bistable relay can be charged from a voltage source U via the high-impedance variable resistor controlling the time constant. For this purpose the core conductor 1 is connected via the beginning A in series with the resistor 2 to the positive pile of the voltage source U, the common contacting M of the metallizing being applied to the negative pole. The charge of the winding may discharge between the above-mentioned points A and M, e.g. via a thyristor 3, resulting in the response of the relay. The discharging is effected at a certain given voltage level, and therefor the ignition of the thyristor is effected by a trigger unit 4 conducting in dependance on the voltage. It is as well possible that the charge of the winding capacitance indirectly controls the responding of the relay (making use of another power source). It is also possible simultaneously with the capacitive charging or discharging of the winding to also inductively load the latter, e.g. with a polarisation current (hold current of the relay). Another possibility for achieving a timing relay functing lies in that the inductive-capacitive coil of the relay is caused to oscillate with its proper oscillation frequency by suitable electronic circuitries and that with the aid of known electronic solutions a release function is effected after a certain number of oscillations. Therein use can be made of the possibility of also changing the natural frequency of the coil for the purpose of determining the delay.

The property of a inductive-capacitive winding of having a certain natural frequency at a given switching mode can be made use of in magnet drives, magnet valves and relays for position indicator and supervision functions. The two or more positions of the working element of a magnetic apparatus correspond to certain natural frequencies, for as a rule an air gap or a reluctance of the magnetic circuit corresponds to every position. Said frequencies may be checked with a superimposed current being sufficiently low for not affecting the function position, this rendering possible an indication to the position of the working element. This possibility is particulary important in case of magnet valves, in which it will otherwise be difficult to detect the position of the working member moving in a liquid. It furtheron is possible to determine the temperature of the winding, which temperature may correspond to the temperature of the medium into which the winding is inserted. Due to the temperature-depending variation of the dielectric constant of the insulation as well as several inductive parameters for a certain working position the natural frequency of the winding also depends on temperature. In many cases a measuring of said frequency makes it possible to determine the temperature of the coil. It has been shown in the main application that an inductive-capacitive winding can store a sufficient amount of energy to effect the actuation of a magnetic drive. In view of the low taking of current of modern electronic circuitries it is possible for a limited period of time to operate control circuitries with e.g. part of said energy.

As has already been described above it is possible to produce unidirectional inductively effective currents in the core conductor by using capacitive currents caused by alternating current with the aid of a diode circuit. With the aid of like techniques it is also possible to produce several unidirectional core conductor currents caused by alternating currents or three-phase current, or magnetic fields, which may be superimposed to one another so that a resulting unidirectional magnetic field corresponds to the sum of said magnetic fields. With such arrangements e.g. three-phase magnets with a common nonlaminated core can be produced, which except for the winding are identic to direct current magnets, i.e. they are plain.

Figure 19:
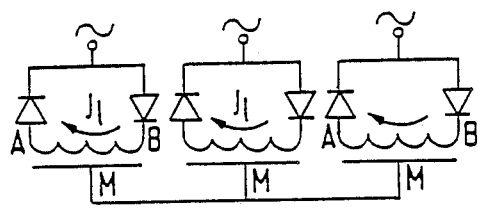
Figure 20:
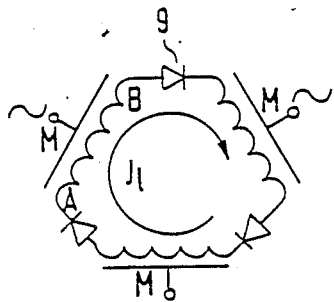

By correspondingly dimensioning the magneto-mechanical parameters (air gaps, spring forces etc.) it is possible—in case of three-phase magnets of said kind—that if only one phase fails the attracting force of the movable anchor decreases to such extend that the latter falls back and thus e.g. actuates contacts. Fields of application could be, among others, contactors switching off the engine in case of a phase failure, for three-phase motors. An example for a circuit of said kind is shown in FIG. 19 and comprises several (in this case three) windings AB the turn metallizations M of which are mutually connected. The beginning A or the end B, respectively, of the respective core conductor or the windings which may be identical (wound commonly) or non-identical, are connected to the anode or cathode, respectively, of two diodes. The free terminals of the diodes are commonly connected to alternating current so that the flowing direction of the inductively effective core conductor current 11 is constant. A similar, simple circuitry which must, however, be disposed in several coil sections being insulated from one another is shown in FIG. 20. Two or more (in this case three) inductive-capacitive, identical or differing windings are arranged in different winding spaces so that the respective common contactings M of the turn metallization are connected to different a.c.-current-carrying conductors (e.g. to the three phase conductors in case of three-phase current). The respective core conductor beginnings A or ends B, respectively, are closed via diodes to form a circuit in which the inductively effective current Il can circularly flow in the direction given by the diodes. For this circuitry and in the circuit according to FIG. 19 the failure of a phase in case of symmetric three-phase current causes the reduction by about one third of the total magnetic field.

Figure 21:
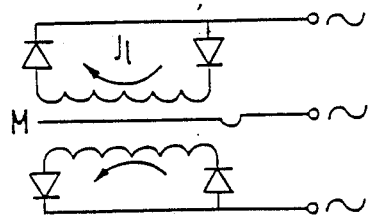

An unsymmetric, particularly simple circuitry causing a reduction of the magnetic field by about 50% when a phase fails in case of symmetric three-phase current, is shown in FIG. 21. An inductive-capacitive winding is bifilarly built in most simple manner with two capacitive winding wires so that the common contacting M of the turn metallization belongs to both core conductors and is connected to one phase. The remaining two phases are connected, as has been described in FIG. 19, to the core conductor beginnings or ends, respectively, of the windings through two diodes. The connection is carried out in such way that the magnetic fields of the two core conductors add up. For the circuits according to FIGS. 19 and 21 the virtual value of the inductive direct current Il (flowing through the core conductor) amounts to half of the capacitive alternating current flowing through the respective phase. This corresponds to the capacitance, frequency and potential to be found between the respective conductors taking part in capacitance generation.

I claim:

1. For use in an electric circuit, an electrical component having both inductive and capacitive properties comprising a winding wire being wound in a coil with at least one winding layer comprising several turns, in which component an inductive current is created by capacitive charges, wherein said winding wire comprises at least one core conductor formed as a wire serving as a capacitive and inductive conductor, an insulating layer being formed as dielectric and surrounding said core conductor, said insulating layer having a thickness substantially less than that of said core conductor, and at least one outer conductor serving as a common capacitor electrode for all turns of said core capacitor electrode for all turns of said core conductor, said outer conductor at least partly surrounding said insulating layer and electrically connected to a common contact at each turn, wherein electrical contacts for connecting the component to the electric circuit are connected to said core conductor and said outer conductor.

2. Component as defined in claim 1, wherein said outer conductor comprises a metal layer of a thickness substantially less than the thickness of said insulating layer.

3. Component as defined in claim 1, wherein said common contact is formed by at least one metal foil in contact with said outer conductor.

4. Component as defined in claim 3, wherein said metal foil is disposed between two winding layers.

5. Component as defined in claim 1, wherein said common contact is formed by a sprayed metallic strip extending across the turns of the coil.

6. Component as defined in claim 1, wherein the turns are applied to a coil former, the common contact being formed by a metal layer of the coil former.

7. Component as defined in claim 2, wherein said outer conductor is interrupted at each of said turns.

8. Component as defined in claim 7, wherein said interruptions of said outer conductor are at the same angular position on each of said turns.

9. Component as defined in claim 1, wherein said dielectric comprises an anodic formation layer and said outer conductor comprises a capacitor electrolyte impregnating a porous spacer, with said common contact bearing on said spacer in the manner of an electrolyte capacitor cathode.

10. Component as defined in claim 9, wherein said anodic formation layer comprises aluminum oxide.

11. Component as defined in claim 9, where in said common contact is formed by at least one metal foil in contact with said outer conductor.

12. Component as defined in claim 9, wherein said metal foil is disposed between two winding layers.

13. Component as defined in claim 1, having formed thereon a second, outer dielectric and a second, outer external conductor, respectively, such that the original dielectric comprises an inner dielectric, and the original external conductor comprises a shell conductor sandwiched between said inner and outer dielectrics.

* * * * *